(12) United States Patent
Keller et al.

(10) Patent No.: US 7,788,989 B2
(45) Date of Patent: Sep. 7, 2010

(54) SELECTOR FORK ARRANGEMENT FOR A MANUAL TRANSMISSION IN A MOTOR VEHICLE

(75) Inventors: Manfred Keller, Driedorf (DE); Olaf Künkler, Oberrossbach (DE)

(73) Assignee: Selzer Fertigungstechnik GmbH & Co. KG, Driedorf-Roth (DE)

( * ) Notice: Subject to any disclaimer, the term of this patent is extended or adjusted under 35 U.S.C. 154(b) by 475 days.

(21) Appl. No.: 11/821,100

(22) Filed: Jun. 21, 2007

(65) Prior Publication Data

US 2008/0314187 A1    Dec. 25, 2008

(51) Int. Cl.
B60K 20/00    (2006.01)
F16H 59/04    (2006.01)
F16H 59/00    (2006.01)
F16H 61/00    (2006.01)
F16H 63/00    (2006.01)

(52) U.S. Cl. ...................... 74/473.36; 74/335
(58) Field of Classification Search ............ 74/335, 74/473.36, 473.37
See application file for complete search history.

(56) References Cited

U.S. PATENT DOCUMENTS

| | | | |
|---|---|---|---|
| H295 H | * 7/1987 | Numazawa et al. | 74/473.37 |
| 6,164,151 A | * 12/2000 | Dutson et al. | 74/473.37 |
| 6,318,206 B1 | * 11/2001 | Kramer et al. | 74/473.37 |
| 2003/0136214 A1 | * 7/2003 | Dinger et al. | 74/473.37 |
| 2009/0114050 A1 | * 5/2009 | Garabello et al. | 74/473.37 |

FOREIGN PATENT DOCUMENTS

| | | |
|---|---|---|
| DE | 103 60 719 A1 | 7/2005 |
| EP | 0 878 646 A1 | 11/1998 |
| GB | 834885 | 5/1960 |

\* cited by examiner

*Primary Examiner*—Thomas R Hannon
*Assistant Examiner*—Justin Krause
(74) *Attorney, Agent, or Firm*—Reising Ethington P.C.

(57) ABSTRACT

A selector fork arrangement for a manual transmission in a motor vehicle is suggested that largely comprises a fork body (1) and carrying element (2,3) that connect the fork body (1) to the control rod (9). Fork body (1) and carrying elements (2, 3) are cut entirely from flat metal and are riveted to one another by means of rivet projections (7, 8, 15), which are themselves formed from the flat metal, and complementary rivet openings in the carrying elements (2, 3). This selector fork arrangement satisfies all requirements in terms of strength and functionality, can be produced and assembled in a simple manner, and does not require any adjustment or finishing processes after assembly and prior to installation in the manual transmission.

17 Claims, 4 Drawing Sheets

SELECTOR FORK ARRANGEMENT FOR A MANUAL TRANSMISSION IN A MOTOR VEHICLE

TECHNICAL FIELD

The invention relates to a selector fork arrangement for a manual transmission in a motor vehicle.

When the subject under discussion in this document is a selector fork or selector fork arrangement, in terms of function this refers to the component or component group that is produced in great numbers and that when installed in the manual transmission of a motor vehicle, as is known, transmits shifting movements from an actuating element, such as a shifting finger provided on a shifting shaft or a gearshift linkage, to a shifting sleeve in order to change gears.

Selector forks generally for the most part have a fork body that is as a rule provided at the ends of the fork body with two engagement sections, the so-called "pads", via which, when installed in the manual transmission for a motor vehicle, the selector fork is mechanically linked to the associated shifting sleeve, also called a sliding sleeve, so that it can be displaced in the axial direction by means of the selector fork.

BACKGROUND OF THE INVENTION

In one known selector fork arrangement (EP 0 878 646 A1, FIGS. 10A, 10E) of the aforesaid type, only the fork body (web plate 3) is a flat blank part, while the carrying element (rib plate 1) is made from a metal strip that is guided around the exterior contour of the fork body with several different bending radii.

Another known selector fork (DE 103 60 719 A1) is composed exclusively of a plurality of bent parts, specifically a center section with an additional support tab that has been bent outward, a connecting part that has been bent numerous times and in different directions, and a semi-cylindrically bent guide component.

In a known gearshift mechanism (GB 834 885, FIG. 4), a selector fork arrangement is provided that is formed from a plurality of selector forks that are made of profile strips and that are at right angles.

All of the known selector fork arrangements contain parts that are bent or angled numerous times and in different directions and sometimes even with different bending radii, which results in significant complexity in terms of work and also results in inaccuracies that can make adjustment and finishing processes necessary.

What is desired is to provide a selector fork arrangement that satisfies all strength and functional requirements, but that can be produced and installed in a simple manner and that after the assembly process and prior to installation in the manual transmission of a motor vehicle does not require any adjustment or finishing processes.

SUMMARY OF THE INVENTION

In accordance with one aspect of the invention, a selector fork arrangement that is for a manual transmission in a motor vehicle is characterized in that provided for each flat support surface is an angular carrying element that is cut from flat metal and that has in one leg the rivet openings allocated to the rivet projections of the fork body, wherein the other leg of the angular carrying element is provided facing away from the fork body, and between the legs of both carrying elements that are provided facing away from the fork body is arranged a bearing part that is cut from flat metal and that is plane-parallel to the fork body, openings that align with one another being provided in the fork body and in the bearing part for the control rod to pass through.

The term "flat metal" used herein refers to flat panels or sheets made of metal materials of suitable strength from which the components of the selector fork arrangement are cut in a precision cutting process. The term "carrying element" as used herein includes all functional and stiffening elements that are connected directly to the fork body and that attach or guide the selector fork on the control rod.

In contrast to all known selector fork arrangements, the inventive selector fork arrangement constitutes exclusively flat, i.e. unbent, parts that are formed by blanks made of flat metal and that are riveted to one another without additional connecting means. Using the special flat geometry of its four components, a selector fork arrangement, formed by the fork body, the two carrying elements, and the bearing part, can be produced and assembled in a simple and precise manner in which no bending processes and no adjustment or finishing processes are necessary. The inventive selector fork arrangement is very stable and compact, the fork body and the bearing part being reminiscent of gable walls and the two carrying elements being reminiscent of roof areas on a house. An advantageously large support and guide width for the inventive selector fork arrangement is attained using the space between the two openings for the control rod.

The inventively embodied selector fork arrangement can be easily assembled by simply putting together the fork body and the carrying elements, the rivet projections entering into the rivet openings until the two parts of the selector fork arrangement stop against one another and these parts assume the provided relative position exactly. Then the parts of the selector fork arrangement are joined securely to one another by cold riveting or warm riveting, mutually aligned. Finishing of the selector fork arrangement embodied in this manner is not necessary.

Preferably, the bearing part is provided with rivet projections that engage in complementary rivet openings on the ends of the legs facing away from the fork body.

Additional stiffening is attained between the fork body and the angular carrying elements when, the legs of the angular carrying elements that are on the fork body each end in an open slot that is aligned with the rivet openings of the leg and that is placed onto a projection on the fork body.

The previously described arrangement permits corresponding attachment of additional parts to the selector switch arrangement, for instance carrier elements joined or riveted to the angular carrying elements, etc.

However, additional elements can also be attached to the fork body and the bearing part in a simple manner, for example such as catch elements for positioning the selector fork arrangement with respect to the associated functional parts of the manual transmission. For this, in the fork body and in the bearing part, in the exterior areas surrounding the openings for the control rods, slots that are open to the outside and aligned with one another are attached in pairs and a catch element cut from flat metal is clampingly inserted into these slots. It is advantageous when the catch element is provided open opposing slots, at the same distance as the spaced slots in the fork body and in the bearing part, that clampingly engage the fork body or the slots of the fork body and bearing part bearing part when the catch element is inserted into the slot.

BRIEF DESCRIPTION OF THE DRAWINGS

Additional details of the invention are explained in greater detail in the following using drawings depicting a preferred exemplary embodiment.

DETAILED DESCRIPTION OF THE EXEMPLARY EMBODIMENT

Figures 5, 6:
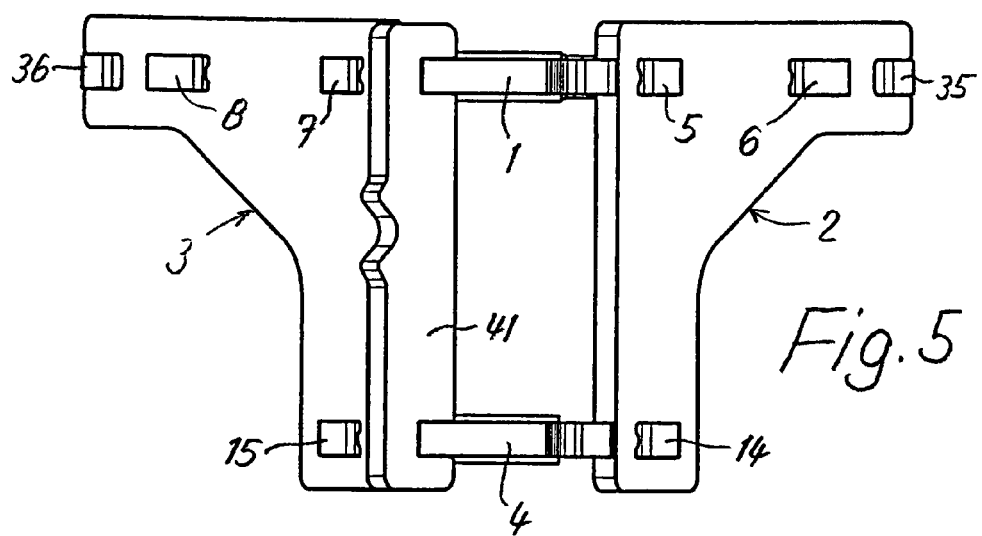
FIG. 5 is the top view of the selector fork arrangement.
FIG. 6 depicts the blank for the fork body.
Figure 7:
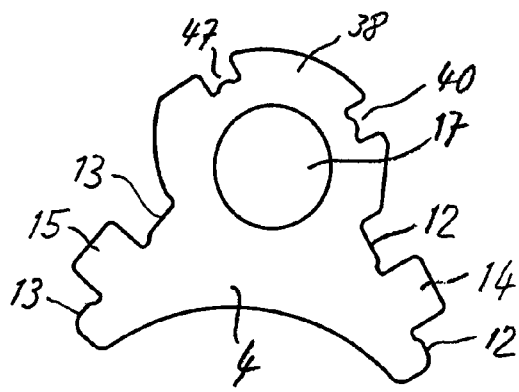
FIG. 7 depicts the blank of the bearing part.
Figure 8:
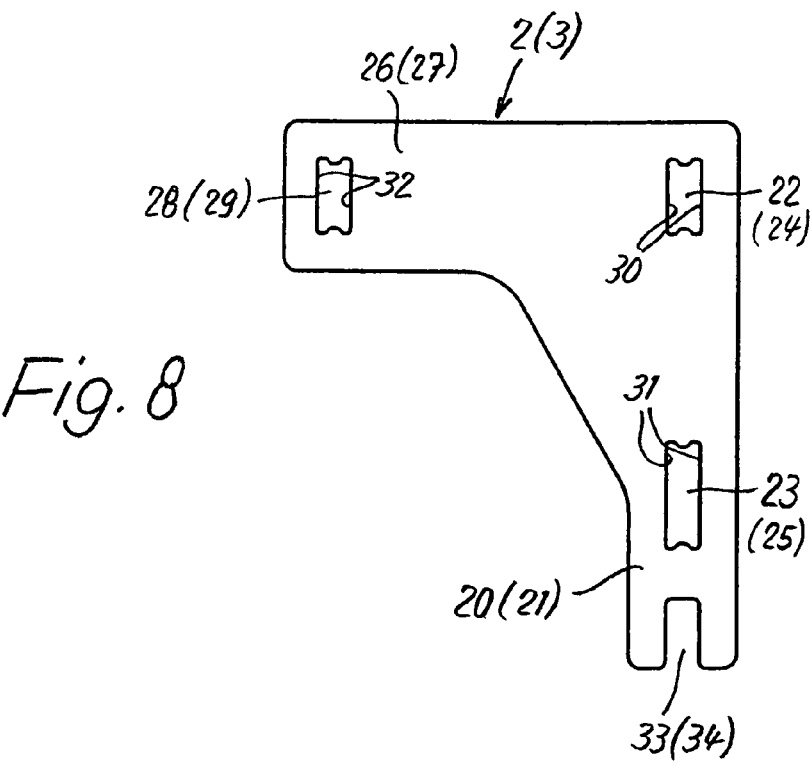
FIG. 8 depicts the blank of one of the angular carrying elements.

The selector fork arrangement constitutes a fork body 1, two angular carrying elements 2 and 3, and a bearing part 4. These parts 1 through 4 are all cut from flat metal with high dimensional accuracy and low tolerances. Each of their blanks are depicted in FIGS. 6 through 8.

Provided on the circumference of the blank for the fork body 1 are for instance four rivet projections 5 through 8 that project from two flat support surfaces 10 and 11 arranged converging toward one another in the direction of the control rod 9. The support surfaces 10 and 11 are each divided into three partial areas by the rivet projections 5 through 8.

Figure 1:
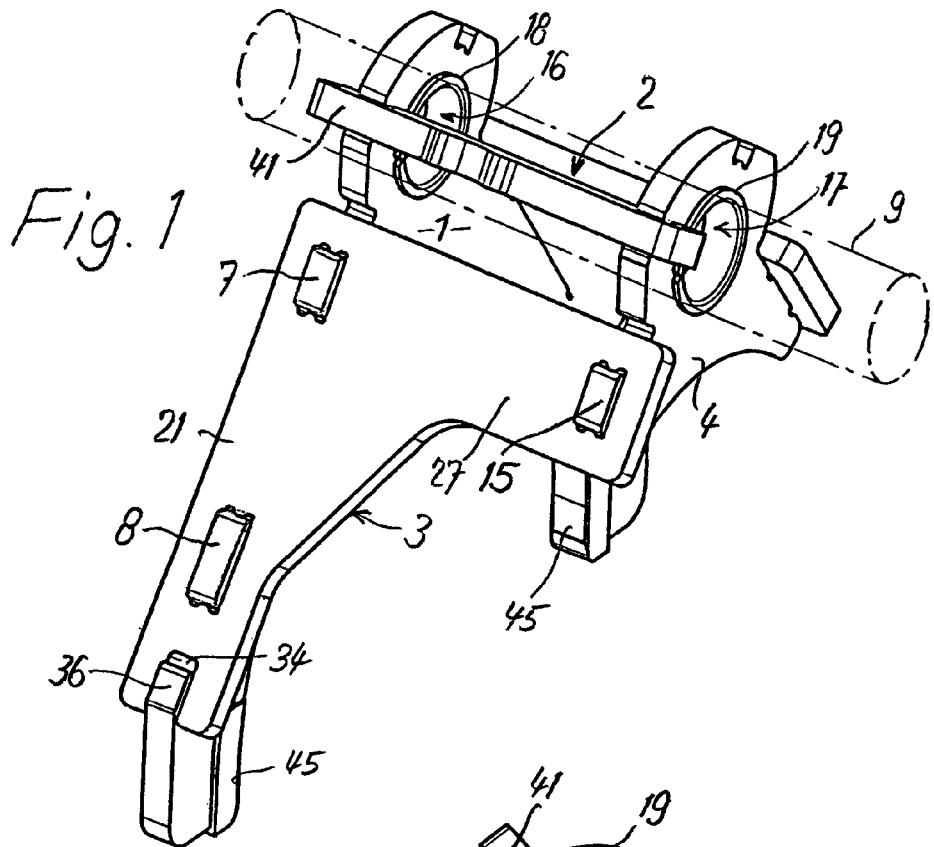
FIG. 1 is a perspective elevation of the selector fork arrangement, viewed from the side and above.

The bearing part 4 is shaped similar to the fork body 1. It also has two support surfaces 12 and 13 from each of which a rivet projection 14 or 15 projects. Provided in the fork body 1 and in the bearing part 4 are openings 16 and 17 that are aligned with one another after the selector fork arrangement has been assembled and that are for the control rod 9, depicted in FIG. 1 with the broken line, to pass through. In the example depicted, bearing bushes 18 and 19 made of a suitable plastic, e.g. polytetrafluorethylene, are inserted in the openings 16 and 17 in order to be able to displace the selector fork arrangement, with low friction on the control rod 9, when changing gears. In the example depicted, the control rod 9 has a circular cross-section. However, arrangements with a control rod that is fixed in the openings 16, 17 are also possible, wherein the selector fork should be borne displaceable together with the control rod.

The angular carrying elements 2 and 3 that connect the fork body 1 to the bearing part 4 are embodied and arranged matching one another in a mirror image. Each of the longer legs 20 and 21 of the carrying elements 2 and 3 are placed on the support surfaces 10 and 11, the rivet projections 5, 6 and 6,7 engaging in complementary allocated rivet openings 22, 23 and 24, 25 that are added to the longer legs 20 and 21.

The shorter legs 26 and 27 of the carrying elements 2 and 3 are provided facing away from the fork body 1. The bearing part 4 is arranged between them, plane-parallel to the fork body 1. The rivet projections 14 and 15 of the bearing part 4 engage in complementary rivet openings 28 and 29 that are present on the ends of the shorter legs 26 and 27.

The rivet projections 5 through 8 and 14, 15 are each embodied in terms of their length such that they project outward beyond the flat metal thickness of the carrying elements 2 and 3. The rivet openings 22 through 25 and 28, 29 each essentially has the shape of a rectangle with pairs of longer sides 30 or 31 or 32 that are spaced apart from one another by about the flat metal thickness for the fork body 1 or the bearing part 4.

The longer legs 20, 21 of the carrying elements 2 and 3 that are on the fork body 1 each end in an open slot 33 and 34 that is aligned with the rivet openings 22, 23, and 24, 25 of the respective longer leg 20, 21 and that is placed on a projection 35 or 36 of the fork body 1.

Figure 9:
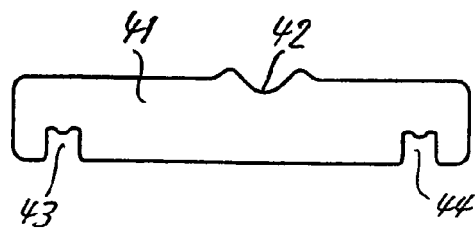
FIG. 9 depicts the blank of a catch element.

Provided in the fork body 1 and in the bearing part 4 in each of the exterior areas 37 and 38 surrounding the openings 16 and 17 are slots 39 and 40 that open outward and that are aligned with one another and that are oriented radial to the openings 16 and 17. In the example illustrated, a catch element 41, also cut from flat metal, is clampingly inserted into these slots. The catch element 41 depicted in the blank in FIG. 9 has a catch depression 42 and open corresponding slots 43 and 44 at the distance of the slots 39 and 40 in the fork body 1 and bearing element 4 that, when the catch element is inserted into the slots 39 and 40, clampingly engage the fork body 1 and the bearing part 4.

Another pair of slots 46 and 47 in the fork body 1 and in the bearing part 4 makes it possible to place the catch element 41 in another position relative to the selector fork arrangement.

Figure 2:
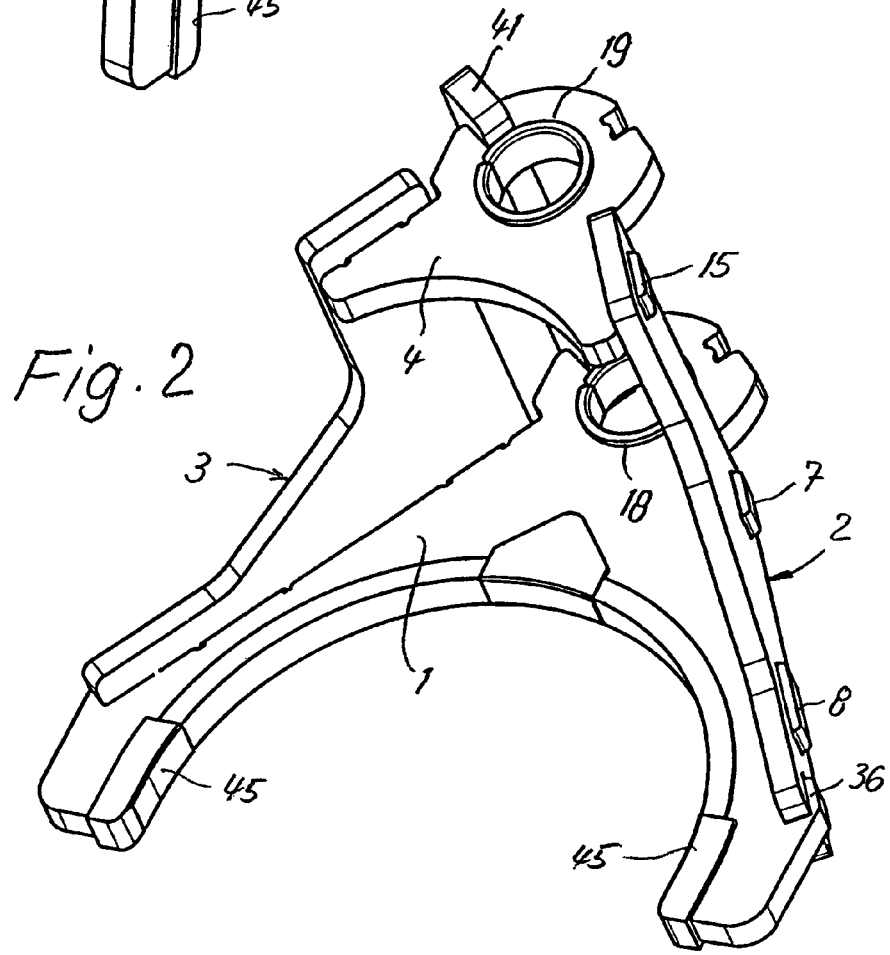
FIG. 2 is another perspective elevation of the selector fork arrangement in accordance with FIG. 1, viewed from the side and below.
Figure 3:
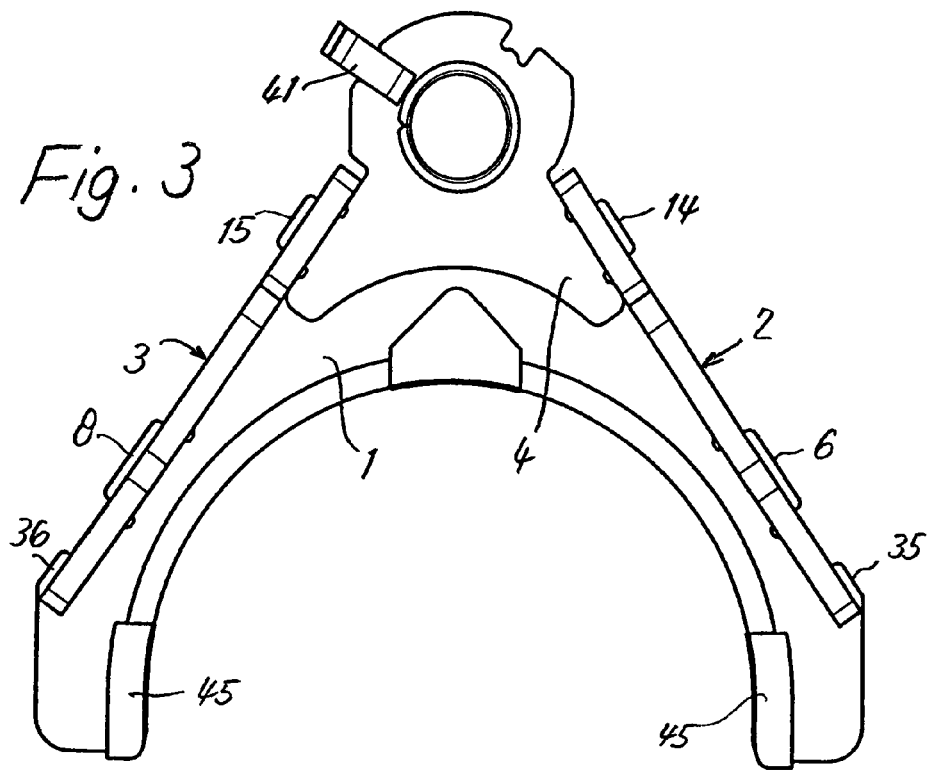
FIG. 3 is the back view of the selector fork arrangement.
Figure 4:
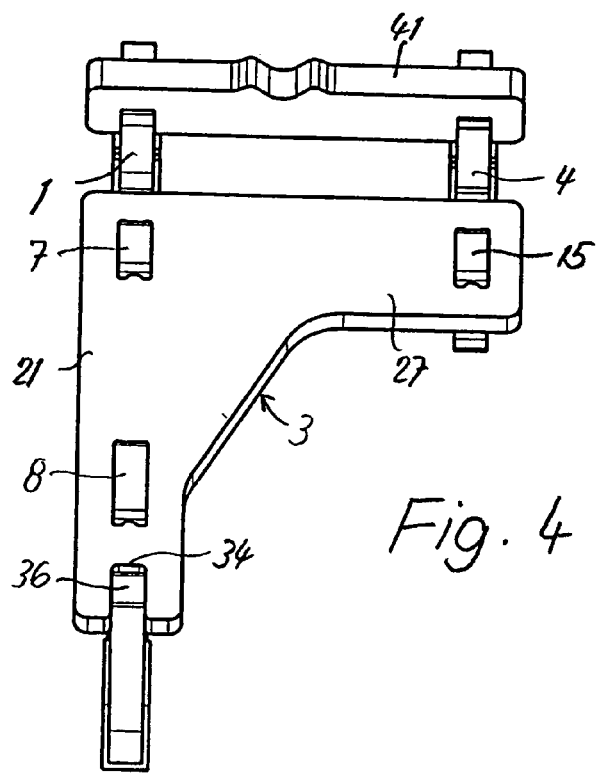
FIG. 4 is a side elevation of the selector fork arrangement.

As can be seen in particular in FIGS. 2, 3, and 6, the fork body 1 is provided on its inner surface, shaped on its inner surface like a semi-circle and attached to both of its lower ends, engagement sections 45 (the so-called "pads") for engaging the selector sleeve (not shown).

All of the components are cut from flat metal and are combined by putting them together and riveting to create the finished selector fork assembly. No bending processes or welding is necessary for this. The selector fork arrangement constructed in this manner can be fabricated and assembled easily, does not require any finishing, and has high dimensional accuracy.

A selector fork arrangement for a manual transmission in a motor vehicle is suggested that largely comprises a fork body and carrying elements that connect the fork body to the control rod. Fork body and carrying elements are cut entirely from flat metal and are riveted to one another by means of rivet projections, which are themselves formed from the flat metal, and complementary rivet openings in the carrying elements. This selector fork arrangement satisfies all requirements in terms of strength and functionality, can be produced and assembled in a simple manner, and does not require any adjustment or finishing processes after assembly and prior to installation in the manual transmission.

We claim:

1. A selector fork arrangement for a manual transmission in a motor vehicle, said selector fork arrangement having
   a fork body that is cut from flat metal;
   a bearing part that is cut from flat metal as a separate member from said fork body and that is plane-parallel to said fork body;
   a control rod which passes through bearing openings that are provided in said fork body and in said bearing part and that aligns with one another;
   two angular carrying elements that are cut from flat metal and each comprise a first leg and a second leg;
   wherein said fork body has two opposing flat support surfaces, for said angular carrying elements, arranged converging toward one another in the direction of said control rod and from which projections project that engage in complementary openings in said first legs of said carrying elements and are riveted therein; and wherein said bearing part is arranged between said second legs of both carrying elements that are provided extending away from said fork body.

2. A selector fork arrangement in accordance with claim 1, characterized in that said bearing part is provided with projections that engage in complementary openings on ends of said second legs of said carrying elements and are riveted therein.

3. A selector fork arrangement in accordance with claim 2, characterized in that in said fork body and in said bearing part, in exterior areas surrounding said bearing openings, slots that are open to the outside and aligned with one another are formed in pairs, wherein a catch element cut from flat metal is clampingly inserted into said slots.

4. A selector fork arrangement in accordance with claim 3, characterized in that said slots in said fork body and in said bearing part are spaced by a slot distance, and that said catch element is provided with opposing slots that are open to the outside and that are spaced at the same slot distance, wherein said opposing slots clampingly engage said fork body and said bearing part, respectively, when said catch element is inserted into said slots of said fork body and said bearing part.

5. A selector fork arrangement in accordance with claim 1, characterized in that said first legs of said angular carrying elements that are on said fork body each end in an open slot that is aligned with said openings of the respective first leg and that is placed onto a projection on said fork body.

6. A selector fork arrangement in accordance with claim 5, characterized in that in said fork body and in said bearing part, in exterior areas surrounding said bearing openings, slots that are open to the outside and aligned with one another are formed in pairs, wherein a catch element cut from flat metal is clampingly inserted into said slots.

7. A selector fork arrangement in accordance with claim 6, characterized in that said slots in said fork body and in said bearing part are spaced by a slot distance, and that said catch element, is provided with opposing slots that are open to the outside and that are spaced at the same slot distance, wherein from said opposing slots clampingly engage said fork body and said bearing part, respectively, when said catch element is inserted into said slots of said fork body and said bearing part.

8. A selector fork arrangement in accordance with claim 1, characterized in that in said fork body and in said bearing part, in exterior areas surrounding said bearing openings, slots that are open to the outside and aligned with one another are formed in pairs, wherein a catch element cut from flat metal is clampingly inserted into said slots.

9. A selector fork arrangement in accordance with claim 8, characterized in that said slots in said fork body and in said bearing part are spaced by a slot distance, and that said catch element is provided with opposing slots that are open to the outside and that are spaced at the same slot distance, wherein said opposing slots clampingly engage said fork body and said bearing part, respectively, when said catch element is inserted into said slots of said fork body and said bearing part.

10. A selector fork arrangement for a manual transmission in a motor vehicle, having a fork body that is cut from flat metal;
a bearing part that is cut from flat metal and that is plane-parallel to said fork body,
a control rod which passes through bearing openings and that are provided in said fork body and in said bearing part and that align with one another;
two angular carrying elements that are cut from flat metal and each comprise a first leg and a second leg;
wherein said fork body has two opposing flat support surfaces, for said angular carrying elements, arranged converging toward one another in the direction of said control rod and from which projections project that engage in complementary openings in said first legs of said carrying elements and are riveted therein;
wherein said bearing part is arranged between said second legs of both carrying elements that are provided facing away from said fork body; and
said bearing part is provided with projections that engage in complementary openings on ends of said second legs extending away from said fork body.

11. A selector fork arrangement in accordance with claim 10, characterized in that in said fork body and in said bearing part, in exterior areas surrounding said bearing openings, slots that are open to the outside and aligned with one another are formed in pairs, wherein a catch element cut from flat metal is clampingly inserted into said slots.

12. A selector fork arrangement in accordance with claim 11, characterized in that said slots in said fork body and in said bearing part are spaced by a slot distance, and that said catch element is provided with opposing slots that are open to the outside and that are spaced at the same slot distance, wherein said opposing slots clampingly engage said fork body and said bearing part, respectively, when said catch element is inserted into said slots of said fork body and said bearing part.

13. A selector fork arrangement for a manual transmission in a motor vehicle, having a fork body that is cut from flat metal;
a bearing part that is cut from flat metal and that is plane-parallel to said fork body,
a control rod which passes through bearing openings and that are provided in said fork body and in said bearing part and that align with one another;
two angular carrying elements that are cut from flat metal and each comprise a first leg and a second leg;
wherein said fork body has two opposing flat support surfaces, for said angular carrying elements, arranged converging toward one another in the direction of said control rod and from which projections project that engage in complementary openings in said first legs of said carrying elements and are riveted therein;
wherein said bearing part is arranged between said second legs of both carrying elements that are provided extending away from said fork body; and
said first legs of said angular carrying elements that are on said fork body each end in an open slot that is aligned with said openings of the respective first leg and that is placed onto a projection on said fork body.

14. A selector fork arrangement in accordance with claim 13, characterized in that in said fork body and in said bearing part, in exterior areas surrounding said bearing openings, slots that are open to the outside and aligned with one another are formed in pairs, wherein a catch element cut from flat metal is clampingly inserted into said slots.

15. A selector fork arrangement in accordance with claim 14, characterized in that said slots in said fork body and in said bearing part are spaced by a slot distance, and that said catch element is provided with opposing slots that are open to the outside and that are spaced at the same slot distance, wherein said opposing slots clampingly engage said fork body and said bearing part, respectively, when said catch element is inserted into said slots of said fork body and said bearing part.

16. A selector fork arrangement for a manual transmission in a motor vehicle, having a fork body that is cut from flat metal;

a bearing part that is cut from flat metal and that is plane-parallel to said fork body, a control rod which passes through bearing openings and that are provided in said fork body and in said bearing part and that align with one another;

two angular carrying elements that are cut from flat metal and each comprise a first leg and a second leg;

wherein said fork body has two opposing flat support surfaces, for said angular carrying elements, arranged converging toward one another in the direction of said control rod and from which projections project that engage in complementary openings in said first legs of said carrying elements and are riveted therein;

wherein said bearing part is arranged between said second legs of both carrying elements that are provided extending away from said fork body; and said fork body and in said bearing part, in exterior areas surrounding said bearing openings, slots that are open to the outside and aligned with one another are formed in pairs, wherein a catch element cut from flat metal is clampingly inserted into said slots.

17. A selector fork arrangement in accordance with claim 16, characterized in that said slots in said fork body and in said bearing part are spaced by a slot distance, and that said catch element is provided with opposing slots that are open to the outside and that are spaced at the same slot distance, wherein said opposing slots clampingly engage said fork body and said bearing part, respectively, when said catch element is inserted into said slots of said fork body and said bearing part.

* * * * *

UNITED STATES PATENT AND TRADEMARK OFFICE
CERTIFICATE OF CORRECTION

PATENT NO. : 7,788,989 B2 Page 1 of 1
APPLICATION NO. : 11/821100
DATED : September 7, 2010
INVENTOR(S) : Manfred Keller and Olaf Künkler It is certified that error appears in the above-identified patent and that said Letters Patent is hereby corrected as shown below:

IN THE CLAIMS:

Claim 7, column 5, line 43 - Before "said", delete "from"

Signed and Sealed this

Twenty-sixth Day of October, 2010

David J. Kappos
*Director of the United States Patent and Trademark Office*